United States Patent
Goto et al.

(10) Patent No.: US 6,645,901 B2
(45) Date of Patent: Nov. 11, 2003

(54) PREPOLYMERIZATION CATALYST FOR USE IN GAS PHASE POLYMERIZATION OF OLEFINS AND PROCESS FOR PRODUCING THE SAME

(75) Inventors: Tomoaki Goto, Sodegaura (JP); Kazuki Wakamatsu, Sodegaura (JP); Shinichi Kumamoto, Ichihara (JP)

(73) Assignee: Sumitomo Chemical Company, Limited, Osaka (JP)

(\*) Notice: Subject to any disclaimer, the term of this patent is extended or adjusted under 35 U.S.C. 154(b) by 26 days.

(21) Appl. No.: 09/820,977

(22) Filed: Mar. 30, 2001

(65) Prior Publication Data

US 2002/0028892 A1 Mar. 7, 2002

(30) Foreign Application Priority Data

Mar. 30, 2000 (JP) ........................................ 2000-093957

(51) Int. Cl.$^7$ ................................................. B01J 31/00
(52) U.S. Cl. ...................... 502/104; 502/103; 502/115; 502/116; 502/125; 526/125.1; 526/124.3; 526/901; 526/908; 526/909; 526/348
(58) Field of Search ................................. 502/103, 104, 502/115, 116, 125; 526/125.1, 124.3, 901, 908, 909, 348

(56) References Cited

U.S. PATENT DOCUMENTS 4,721,763 A    1/1988  Baily et al.
5,275,993 A    1/1994  Fujita et al.

FOREIGN PATENT DOCUMENTS

EP    0 360 491 A2     3/1990
EP    0 942 007 A2 *   9/1999
JP    59-30806         2/1984
JP    9-221512         8/1997
JP    9-316108        12/1997
JP    11-322833       11/1999

\* cited by examiner

*Primary Examiner*—Ling-Siu Choi
(74) *Attorney, Agent, or Firm*—Sughrue Mion, PLLC

(57) ABSTRACT

A prepolymerization catalyst for use in a gas phase polymerization of an olefin or combinations of olefins which comprises (A) a solid catalyst component comprising magnesium, halogen, titanium and an electron donor and having a weight-average particle diameter of 15 to 45 μm, (B) at least one organoaluminum compound and (C) a prepolymer of an ethylene and/or at least one α-olefin, wherein the molar ratio of aluminum to titanium in the prepolymerization catalyst (Al/Ti ratio) is 3 to 11 (mol/mol), the weight ratio of the prepolymerization catalyst to the solid catalyst component (prepolymerization catalyst/solid catalyst component) is 2 to 35 (g/g), the content of volatile materials (VM) in the prepolymerization catalyst is 2.0% by weight or less, and the intrinsic viscosity [η] measured in tetralin at 135° C. is 2.0 dl/g or less, and a process for a production thereof.

According to the present invention, a prepolymerization catalyst for gas phase polymerization of olefins showing a high activity in gas phase polymerization, not forming aggregates and coarse particles markedly at the time of prepolymerization, having a high bulk density and an excellent fluidity, not causing a marked entraining of prepolymerization catalyst and product powder out of the fluidized bed and nearly completely free from a formation of aggregates, at the time of gas phase polymerization, and giving an olefin polymer having a low content of cold xylene-soluble fraction can be provided.

9 Claims, No Drawings

PREPOLYMERIZATION CATALYST FOR USE IN GAS PHASE POLYMERIZATION OF OLEFINS AND PROCESS FOR PRODUCING THE SAME

FIELD OF THE INVENTION

The present invention relates to a prepolymerization catalyst for use in a gas phase polymerization of olefins. More particularly, the invention relates to a prepolymerization catalyst for use in a gas phase polymerization of olefins showing a high activity in gas phase polymerization, not causing a formation of aggregates and coarse polymer particles markedly during the prepolymerization, having high bulk density and excellent fluidity, not causing an entraining of the prepolymerization catalyst and a product powder out of a fluidized bed markedly and nearly completely free from a formation of polymer aggregates at the time of the gas phase polymerization, and capable of giving an olefin polymer low in the content of cold xylene-soluble fraction, and a process for producing the same.

BACKGROUND OF THE INVENTION

Since olefin polymers have high mechanical property such as strength, good appearance such as transparency, and excellent moldability or handling property such as film-forming property, olefin polymers are extensively used as a material for films and molded articles. Among the olefin polymers, polyethylenes such as ethylene homopolymers and linear low-density polyethylenes (LLDPE), which are ethylene-α-olefin copolymers, are especially suitable for use as film-forming materials.

High-activity catalysts for production of olefin polymers have a very high industrial value, because they can be used in the gas phase olefin polymerization process in which the de-ashing step is simplified. However, when an olefin is polymerized by a gas phase polymerization process using a high-activity catalyst, the polymerization is accompanied by generation of a large quantity of heat, and thereby fusion and aggregation of the resulting olefin polymer may take place and it may become difficult to continue the polymerization of olefin or produce olefin polymer.

As a method for preventing the above-mentioned aggregation of polymer generated in olefin polymerization, there is known a method of using, as a catalyst for gas phase polymerization of olefin, a prepolymerization catalyst obtained by prepolymerizing ethylene and/or an α-olefin on an olefin-polymerizing catalyst.

For instance, JP-A-59-30806, JP-A-7-196720 and JP-A-8-337611 disclose a prepolymerization catalyst which is a powder of an α-olefin prepolymer having such a particle dimension distribution that the mass-average diameter (Dm) is 80–300 μm and the ratio of number-average diameter (Dn) to the mass-average diameter (Dm) is smaller than or equal to 3, and also disclose that olefin polymers such as ethylene homopolymer or ethylene-butene-1 copolymer can be obtained by continuously effecting an olefin polymerization by using the above-mentioned powdery prepolymer in a gas phase polymerization.

SUMMARY OF THE INVENTION

However, if a catalyst having higher activity such as those described in JP-A-11-322833 is subjected to a prepolymerization in a suspension polymerization system, in some cases the prepolymerization catalyst is not smoothly drawn out of the suspension polymerization reactor because coarse granules or aggregates of polymer are formed and fluidity of the prepolymerization catalyst is extremely insufficient due to its low bulk density. Furthermore, there was a problem that when fluidity of the prepolymerization catalyst is insufficient, the quantity of prepolymerization catalyst fed cannot be kept constant at the time of the feeding of the prepolymerization catalyst to a gas phase fluidized bed type gas phase polymerization reactor together with a gas stream, which causes fluctuation of olefin polymerization temperature or formation of olefin polymer aggregates in the gas phase fluidized bed type gas phase polymerization reactor and thereby makes it difficult to polymerize the olefin steadily.

Under the above-mentioned circumstances, it is desired to develop a prepolymerization catalyst for use in the gas phase polymerization of olefins high in the activity in gas phase polymerization, not causing formation of aggregates and coarse granules markedly at the time of prepolymerization, high in bulk density, excellent in fluidity, causing no remarkable entraining of the prepolymerization catalyst and the resulting powdery olefin polymer out of the fluidized bed at the time of gas phase polymerization, nearly completely free from formation of polymer aggregates, and giving an olefin polymer low in the content of cold xylene-soluble fraction.

It is an object of the present invention to provide a prepolymerization catalyst for use in the gas phase polymerization of olefins high in the activity in gas phase polymerization, not causing formation of aggregates and coarse granules markedly at the time of prepolymerization, high in bulk density, excellent in fluidity, causing no remarkable entraining of the prepolymerization catalyst and the resulting powdery olefin polymer out of the fluidized bed at the time of gas phase polymerization, nearly completely free from formation of polymer aggregates, and giving an olefin polymer low in the content of cold xylene-soluble fraction, and a process for producing the same.

In view of the above, the present inventors have conducted extensive studies to find that the problem mentioned above can be solved by a prepolymerization catalyst comprising a solid catalyst component having a specified weight-average particle diameter, an organoaluminum compound and a prepolymer of ethylene and/or at least one α-olefin and having a specified aluminum-titanium ratio, a specified weight ratio of prepolymerization catalyst/solid catalyst component, a specified volatile material content and a specified intrinsic viscosity. Based on this finding, the present invention has been accomplished.

Thus, the present invention relates to a prepolymerization catalyst for use in a gas phase polymerization of olefins which comprises (A) a solid catalyst component comprising magnesium, halogen, titanium and an electron donor and having a weight-average particle diameter of 15–45 μm, (B) at least one organoaluminum compound and (C) a prepolymer of an ethylene and/or at least one α-olefin, wherein the molar ratio of aluminum to titanium (Al/Ti ratio) contained in said prepolymerization catalyst is 3 to 11 (mol/mol), the weight ratio of the prepolymerization catalyst to the solid catalyst component (prepolymerization catalyst/solid catalyst component ratio) is 2 to 35 (g/g), the content of volatile materials (VM) in the prepolymerization catalyst is 2.0% by weight or less, and the intrinsic viscosity [η] of the prepolymerization catalyst measured in tetralin at 135° C. is 2.0 dl/g or less, and a process for a production of the prepolymerization catalyst.

The present invention further relates to a process for producing an olefin polymer which comprises polymerizing olefins by means of a gas phase fluidized bed using the above-mentioned prepolymerization catalyst for gas phase polymerization.

Next, details of the present invention will be described below.

DETAILED DESCRIPTION OF THE INVENTION

As used in the present invention, the term "polymerization" means not only a homopolymerization, but also inclusively means a copolymerization; and the term "polymer" means not only a homopolymer but also means a copolymer inclusively.

As used in the present invention, the term "olefin" means an olefin having 2 or more carbon atoms which include, for instance, ethylene, propylene, butene-1, pentene-1, hexene-1, heptene-1, octene-1, decene-1,3-methylpentene-1,4-methylpentene-1, and the like, and it means preferably ethylene, propylene, butene-1, hexene-1, octene-1 and 4-methylpentene-1, and further preferably ethylene, propylene, butene-1 and hexene-1.

The term "gas phase polymerization" used in the present invention means a polymerization process used for polymerizing olefins in a gas phase. It is known that a gas phase polymerization process requires only a smaller investment and a lower energy cost as compared with other polymer-producing processes such as a suspension polymerization process and a solution polymerization process. In the gas phase polymerization, a gas phase fluidized bed type reactor is usually used in order to make a smooth progress of the polymerization reaction. Herein, the term "gas phase fluidized bed type reactor" means a reactor utilizing a fluidized bed, in which a reaction is conducted in a bed of powdery particles filled in the reactor and kept in a floating state by the action of a gas introduced through a plate with many pores which is provided at the bottom of the apparatus (this plate is called a gas-dispersing plate) (this state of the floating particles is called a "fluidized bed").

As used in the present invention, the term "prepolymerization" means a process of polymerizing a small quantity of olefins by the use of (A) a solid catalyst component comprising magnesium, halogen, titanium and an electron donor and having a weight-average particle diameter of 15–45 μm and (B) at least one organoaluminum compound, to form an olefin polymer on the solid catalyst component; and a product obtained by the prepolymerization is a prepolymerization catalyst.

As the olefins which can be used in the prepolymerization of the present invention, the same olefins as used in the above-mentioned gas phase polymerization process can be referred to. The olefins may be one species of olefin or a combination of two or more olefins.

A process for producing the prepolymerization catalyst is not particularly limited, and a suspension polymerization process, a gas phase polymerization process and the like can be referred to. Preferably, it is a suspension polymerization process. It may be produced by the use of any of batch method, semi-batch method and continuous method.

In a case where the prepolymerization catalyst is produced by a suspension polymerization process, a solvent may be a hydrocarbon having 20 or less carbon atoms. Examples thereof include saturated aliphatic hydrocarbons such as propane, n-butane, isobutane, n-pentane, isopentane, hexane, heptane, octane, decane and the like, and aromatic hydrocarbons such as toluene, xylene and the like. Among these hydrocarbons, n-butane, hexane, heptane and toluene are preferable, and n-butane and hexane are further preferable.

A slurry concentration in the suspension polymerization may be a usual concentration. A preferable slurry concentration is 0.001–0.5 g/ml and a further preferable concentration is 0.005–0.4 g/ml, as expressed in terms of solid catalyst quantity per milliliter solvent.

Although the speed of stirring in the polymerization reactor for prepolymerization is not particularly limited, it is preferably a stirring speed at which the solid catalyst component and the prepolymerization catalyst can be kept in a floating state, namely a speed not lower than the critical speed necessary for floatation of stirred particles.

The polymerization temperature of the prepolymerization may be a usual polymerization temperature. It is preferably a temperature ranging from −10° C. to 100° C., and further preferably from 0° C. to 70° C. The polymerization pressure of the prepolymerization may be a usual polymerization pressure. It is preferably a pressure ranging from atmospheric pressure to 4.0 MPaG.

As the method for controlling the intrinsic viscosity [η] of the prepolymerization catalyst measured in tetralin at 135° C., a method using a chain transfer agent such as hydrogen, an organometallic compound and the like, and a method of controlling the prepolymerization temperature, etc. can be referred to. A preferable method is the method using hydrogen. As the method using hydrogen, a method of adding hydrogen before feeding ethylene, a method of adding hydrogen with controlling a flow rate simultaneously with feeding ethylene, etc. can be referred to.

The prepolymerization catalyst is generally obtained in a state of dryness. As the method for drying, a method of drying a prepolymerization catalyst while flowing a nitrogen gas stream, a method of vacuum drying using a vacuum pump, etc. can be referred to.

As used herein, the term "magnesium" which is contained in the solid catalyst component (A) means a magnesium atom belonging to Group 2 of the periodic table, and the term "titanium" means a titanium atom belonging to Group 4 of the-periodic table.

The term "halogen" which is contained in the solid catalyst component (A) means a halogen which is an element belonging to Group 17 of the periodic table. Examples thereof include a chlorine atom, a bromine atom, an iodine atom and the like, and it is preferably a chlorine atom.

The term "electron donor" which is contained in the solid catalyst component (A) means an organic compound containing at least one member of an oxygen atom, a sulfur atom, a nitrogen atom and/or a phosphorus atom. Examples thereof include amines, sulfoxides, ethers and esters. It is preferably an ether or an ester.

As the ethers, dialkyl ethers can be referred to. Examples thereof include diethyl ether, dibutyl ether, tetrahydrofuran and the like. It is preferably dibutyl ether or tetrahydrofuran.

As the esters, esters of saturated aliphatic carboxylic acids, esters of unsaturated aliphatic carboxylic acids, esters of alicyclic carboxylic acids, esters of aromatic carboxylic acids, and the like can be referred to. Examples thereof include ethyl acetate, ethyl acrylate, ethyl methacrylate, butyl benzoate, dibutyl succinate, dibutyl malonate, dibutyl maleate, dibutyl itaconate, di-n-butyl phthalate, diisobutyl phthalate, di-2-ethylhexyl phthalate, di-n-octyl phthalate, and the like. Among these esters, preferred are di-2-ethylhexyl phthalate and di-n-octyl phthalate.

The solid catalyst component (A) is preferably a product obtained by bringing a solid catalyst component precursor containing magnesium, titanium and a hydrocarbyloxy group into contact with a halogen compound of an element belonging to Group 14 of the periodic table and an electron donor to obtain a contacted product, followed by further bringing the contacted product into contact with a compound having a Ti-halogen bond.

Said solid catalyst component precursor containing magnesium, titanium and a hydrocarbyloxy group is preferably a solid product containing a trivalent titanium atom which can be obtained by reducing a titanium compound represented by the following general formula:

$$Ti(OR^1)_a X_{4-a}$$

wherein $R^1$ is a hydrocarbon group having 1–20 carbon atoms, X is a halogen atom and a is a number satisfying 0<a<4, with an organomagnesium compound in the presence of an organosilicon compound having a Si—O bond.

As said organosilicon compound having a Si—O bond, tetramethoxysilane, tetraethoxysilane, tetrapropoxysilane, tetrabutoxysilane and the like can be referred to, among which preferred is tetrabutoxysilane.

As the hydrocarbon group ($R^1$) of the titanium compound represented by the general formula $Ti(OR^1)_a X_{4-a}$, wherein $R^1$ is a hydrocarbon group having 1–20 carbon atoms, X is a halogen atom and a is a number satisfying 0<a<4, for example, a methyl group, an ethyl group, a propyl group, a butyl group and the like can be referred to, among which preferred is a butyl group.

As the halogen atom (X) of the titanium compound represented by the general formula $Ti(OR^1)_a X_{4-a}$, a chlorine atom, a bromine atom, an iodine atom and the like can be referred to, among which preferred is a chlorine atom. The number a is 1, 2, 3 or 4, and it is preferably 4.

As the titanium compound represented by the general formula $Ti(OR^1)_a X_{4-a}$, for example, butoxytrichlorotitanium, dibutoxydichlorotitanium, tributoxychlorotitanium, tetrabutoxytitanium and the like can be referred to, among which preferred is tetrabutoxytitanium.

As the organomagnesium compound, Grignard compounds having a Mg-carbon bond and the like can be referred to. Examples thereof include methylchloromagnesium, ethylchloromagnesium, propylchloromagnesium, butylchloromagnesium and the like, among which preferred is butylchloromagnesium.

As the halogen compound of an element belonging to Group 14 of the periodic table to be contacted with the solid catalyst component precursor, halogen compounds of carbon atom or silicon atom can be referred to. It is preferably a halogen compound of silicon atom represented by the following general formula:

$$SiR^2_{4-b} X_b$$

wherein $R^2$ is a hydrocarbon group having 1–20 carbon atoms, X is a halogen atom and b is a number satisfying 0<b<4.

As the hydrocarbon group ($R^2$) of the silicon compound represented by the general formula $SiR^2_{4-b} X_b$, wherein $R^2$ is a hydrocarbon group having 1–20 carbon atoms, X is a halogen atom and b is a number satisfying o<b<4, for example, a methyl group, an ethyl group, a propyl group, a butyl group and the like can be referred to, among which preferred is a butyl group.

As the halogen atom (X) of the silicon compound represented by the general formula $SiR^2_{4-b} X_b$, a chlorine atom, a bromine atom, an iodine atom and the like can be referred to, among which preferred is a chlorine atom. The number b is 1, 2, 3 or 4, and it is preferably 4.

As the silicon compound represented by the general formula $SiR^2_{4-b} X_b$, for example, butyltrichlorosilane, dibutyldichlorosilane, trichlorobutylsilane, tetrachlorosilane and the like can be referred to, among which preferred is tetrachlorosilane.

As the electron donor to be brought into contact with the solid catalyst component precursor, the same ones as mentioned above can be referred to.

As the halogen in the compound having a Ti—O bond to be further brought into contact with the contacted product, which is obtained by contacting the solid catalyst component precursor with the halogen compound of an element belonging to Group 14 of the periodic table and the electron donor, a chlorine atom, a bromine atom, an iodine atom and the like can be referred to, among which preferred is a chlorine atom.

As the compound having a Ti-halogen bond, for example, tetrachlorotitanium, trichlorobutoxytitanium, dichlorodibutoxytitanium, chlorotributoxytitanium and the like can be referred to, among which preferred is tetrachlorotitanium.

Weight-average particle diameter of the solid catalyst component (A) of the present invention is 15–45 μm, and preferably 20–35 μm.

When the weight-average particle diameter of the solid catalyst component (A) is smaller than 15 μm, it can occur that the prepolymerization catalyst is entrained out of the gas phase fluidized bed to obstruct an effective use of the catalyst or that the prepolymerization catalyst adheres to the wall of enlarged part of the gas phase fluidized bed type reactor to generate a formation of aggregates. When the weight-average particle diameter of the solid catalyst component (A) exceeds 45 μm, it can occur that bulk density of the resulting polymer powder decreases or the content of cold xylene-soluble fraction thereof increases.

As used in the present invention, the term "organoaluminum compound (B)" means a compound having at least one Al-carbon bond. Examples thereof include trimethylaluminum, triethylaluminum, triisobutylaluminum and the like, among which preferred is triethylaluminum.

As used in the present invention, the term "prepolymer (C) of ethylene and/or at least one α-olefin" means a polymer of ethylene and/or at least one α-olefin which is formed on the solid catalyst component (A) by contacting the solid catalyst component (A), an organoaluminum (B) and olefins which are ethylene and/or at least one α-olefin.

As the α-olefin, olefins having 3 or more carbon atoms among the olefins used in the above-mentioned gas phase polymerization can be referred to. Examples thereof include propylene, butene-1, hexene-1, pentene-1,3-methylpentene-1, and the like.

In the prepolymerization catalyst of the present invention, the ratio of aluminum atom to titanium atom [Al/Ti ratio (mol/mol)] contained therein is 3 to 11, and preferably 4 to 8. When the Al/Ti ratio is less than 3, it can occur that a polymerization rate in the prepolymerization lowers or an activity of catalyst in gas phase polymerization lowers. When the Al/Ti ratio exceeds 11, it can occur that the olefin polymer obtained by gas phase polymerization contains an increased quantity of cold xylene-soluble fraction.

In the prepolymerization catalyst of the present invention, the ratio of the prepolymerization catalyst to the solid catalyst component (prepolymerization catalyst/solid catalyst component) is 2 to 35 (g/g), and preferably 4 to 25 (g/g). When the (prepolymerization catalyst/solid catalyst component) ratio is smaller than 2 g/g, it can occur that the gas phase polymerization generates much quantity of heat due to the polymerization and thereby the olefin polymer formed by the reaction melts or aggregates to make the progress of gas phase polymerization difficult. When the (prepolymerization catalyst/solid catalyst component) ratio exceeds 35 g/g, it can occur that the equipment for prepolymerization must be designed so as to have an extremely large dimension or the powder obtained by the gas phase polymerization has a lowered bulk density.

Although the weight-average particle diameter of the prepolymerization catalyst of the present invention is not particularly limited, it is preferably 15 to 75 μm and more preferably 20 to 75 μm, in the point of the bulk density of the powder obtained in the gas phase polymerization and the entraining of the prepolymerization catalyst and the powder formed in the gas phase polymerization.

In the prepolymerization catalyst of the present invention, the term "content of volatile materials (VM)" means the quantity of the solvent used for the prepolymerization and unreacted olefins remaining in the prepolymerization catalyst. Content of the volatile materials (VM) is 2.0% by weight or less, preferably 1.0% by weight or less, and most preferably 0% by weight. When the content of volatile materials (VM) exceeds 2.0% by weight, a fluidity of the prepolymerization catalyst becomes low.

Intrinsic viscosity [η] of the prepolymerization catalyst of the present invention measured in tetralin at 135° C. is 2.0 dl/g or less, preferably 1.7 dl/g or less, and further preferably 1.5 dl/g or less. When the intrinsic viscosity [η] exceeds 2.0 dl/g, bulk density of the prepolymerization catalyst can become low or many coarse particles can be formed, due to which a fluidity of the prepolymerization catalyst becomes low. The decrease in fluidity makes a cause of defective drawing-out of prepolymerization catalyst from the reactor or an insufficient feeding of prepolymerization catalyst into the reactor of the subsequent step, namely the step of gas phase polymerization constituting a main step of the process.

The use of the prepolymerization catalyst of the present invention makes it possible to effect a gas phase polymerization, constituting a main step of the polymerization process, effectively. The gas phase polymerization can be carried out according to known procedure, by using the above-mentioned fluidized bed reactor. Generally, the reaction temperature is 30–110° C., the reaction pressure is 0.1–5.0 MPa, and the gas flow rate in the reactor is 10–100 cm/sec., but these factors can be appropriately selected by specialists in the art.

EXAMPLES

Next, the present invention is explained in more detail with reference to examples. The invention is by no means limited by these examples.

In the examples shown below, characteristic properties of polymers were measured by the methods mentioned below.
(1) Density
Density was measured according to JIS K-6760.
(2) MFR (melt flow rate)
MFR was measured according to JIS K-6760 at 190° C.
(3) Bulk Density
Bulk Density was measured according to JIS K-6721.
(4) Intrinsic Viscosity [η]
Intrinsic viscosity was determined by dissolving a sample in tetralin, and measuring viscosity of the solution by the use of a viscometer at 135° C.
(5) Cold Xylene-soluble Fraction Content
It was measured according to the method prescribed in USA, Code of federal regulations, Food and Drugs Administration, §175, 1520.
(6) Volatile Material Content (VM)
VM was measured by measuring percent loss in weight (loss-in-weight method) or by gas chromatography method.
(6-1) Loss-in-weight Method
The method of measuring percent loss in weight was adopted in cases where a prepolymerization catalyst had a volatile material content of about 1% by weight or above. In this method, mass of a prepolymerization catalyst sample before heating and mass of the same sample as above after heating in an inert gas atmosphere at 110° C. for one hour were measured. Difference between the first mass and the second mass (loss in weight) was calculated, from which the ratio of the mass of the prepolymerization catalyst after heating to the mass of the prepolymerization catalyst before heating was calculated.
(6-2) Gas Chromatography Method
Gas chromatography method was adopted in cases where a prepolymerization catalyst had a volatile material content of about 1% by weight or below. In this method, volatile components such as hydrocarbons were extracted out of a prepolymerization catalyst, and proportions thereof to the prepolymerization catalyst were calculated from peak areas in the gas chromatogram, using a calibration curve previously prepared by an internal standard method.
(7) Weight-average Particle Diameter
Weight-average particle diameter of the solid catalyst component A was measured with an ultra-centrifugal automatic particle size distribution measuring apparatus (CAPA-700, manufactured by Horiba Seisakusho). As a dispersion medium of the catalyst component, decahydronaphthalene was used.

Weight-average particle diameter of prepolymerization catalyst was measured with a laser-diffraction type particle size distribution measuring apparatus (HELOS & RODOS System, manufactured by SYMPATEC Co.).

In the examples, an entrainment rate was evaluated by a method mentioned below. An entrainment rate expresses the state of operation. A lower entrainment rate denotes a more stable state of operation, while a higher entrainment rate denotes a less stable state of operation.
(8) Entrainment Rate
An entrained quantity was defined as a summed quantity of the prepolymerization catalyst and the product powder captured by a cyclone provided in the halfway of recycle line of circulated gas in a gas phase fluidized bed reactor. Further, an entrainment rate was defined as an entrained quantity per unit period of time divided by a production amount per unit period of time, multiplied by 100. Unit of the entrainment rate is % by weight. The quantity of the prepolymerization catalyst and the product powder entrained out of fluidized bed entrained with a circulating gas at the time of gas phase polymerization was evaluated by referring to the entrainment rate.

Example 1

(1) Synthesis of Solid Catalyst Component (A1)
After replacing the inner atmosphere of a SUS-made reactor equipped with a stirrer and having an inner volume of 200 L with nitrogen gas, 80 L of hexane, 20.6 kg of tetraethoxysilane and 2.23 kg of tetrabutoxytitanium were charged and adjusted to 20° C.

Subsequently, 50 L of a 2.0 mol/L solution of butylmagnesium chloride in dibutyl ether solvent was dropwise added over a period of 4 hours with stirring, while keeping a temperature of 20° C. At this time, the rotation speed of the stirrer was 200 rpm. After the dropping, the resulting mixture was stirred for an additional one hour at 20° C. and filtered, and the precipitate was washed with 70 L toluene three times. Then, 63 L of toluene, 11.6 kg of silicon tetrachloride ($SiCl_4$) and 9.37 kg of di(2-ethyhexyl)phthalate (hereinafter, this term may be sometimes referred to as DOP) were added, and a reaction was carried out at 105° C. for 2 hours.

Subsequently, the reaction mixture was filtered and washed with three 90 L portions of toluene, 63 L of toluene was added and heated to 70° C., and then 13.0 kg of $TiCl_4$ was added and reacted at 105° C. for 2 hours. After separating the solid from the liquid, the solid was washed with six 90 L portions of toluene at 95° C. and then with two 90 L portions of hexane at room temperature, and dried to obtain 13.7 kg of a solid catalyst component (A1) excellent in powder characteristics. The solid catalyst component (A1) thus obtained contained Ti in an amount of 1.02% by weight, and weight-average particle diameter thereof was 21 $\mu$m.

(2) Prepolymerization

After replacing the inner atmosphere of an autoclave equipped with a stirrer and having an inner volume of 210 L with nitrogen, 1.51 kg of the solid catalyst component (A1) obtained by the above-mentioned synthesis was added at an ordinary temperature and then 100 L of butane and triethylaluminum (hereinafter, sometimes referred to as TEA) were added so that the quantity of aluminum in TEA came to 5 times by mol as much as that of Ti in the solid catalyst component (A1), namely Al/Ti came to 5. The inner pressure of the reactor after introduction of butane was 0.18 MPaG. Then, hydrogen was added until the inner pressure of reactor reached 1.28 MPaG, after which heating was started, so that the temperature began to rise toward a preset temperature of 40° C., and at the same time a feeding of ethylene was started. After the temperature had reached the preset temperature, a polymerization was made to progress at an average temperature of 39.7° C. and at an average pressure of 1.81 MPaG. When 7.4 hours had passed after starting the feeding of ethylene, the feeding of ethylene was stopped to quench the reaction. Then, the butane was flashed out, and the residue was dried under a stream of nitrogen for 3 hours to obtain 29.2 kg of prepolymerization catalyst (1). The prepolymerization catalyst (1) could smoothly be withdrawn from the reactor.

The prepolymerization catalyst (1) thus obtained was sieved through a 36 mesh metal gauze in an atmosphere of nitrogen to remove coarse particles (aggregates) therefrom. After the sieving, the proportion of coarse particles recovered from the upper part of the sieve was as small as 1.2% by weight based on the total quantity of recovered product. The Al/Ti ratio in the prepolymerization catalyst thus obtained was 5, the ratio of the mass of prepolymerization catalyst to the mass of the solid catalyst component (A1) (prepolymerization catalyst/solid catalyst component) was 11.3 g/g, the volatile material content of the prepolymerization catalyst (1) was 0.42% by weight, the intrinsic viscosity [η] was 1.46 dl/g, the bulk density was 0.390 g/cm³, and the weight-average particle diameter was 55 $\mu$m.

(3) The Method of Main Polymerization

Using the prepolymerization catalyst (1) obtained above, a copolymerization of ethylene and butene-1 was carried out in a continuous gas phase fluidized bed type reactor. During the polymerization, the inner temperature of the reactor was 89° C., the inner pressure of the reactor was 2.0 MPaG, the gas flow rate in the reactor was 34 cm/s, and the gas composition ratio (ethylene/1-butene/hydrogen molar ratio) was 64/26/10 by mol. The solid catalyst component (A1) was transported together with gas stream at a feeding rate of 0.83 g/h, and TEA was fed at a rate of 408 mol/mol times of Ti in the solid catalyst component (A1), to carry out the polymerization.

As a result, the catalyst activity [mass of resulting polymer per gram of solid catalyst component (A1), (g/g)] was 27,000 g/g at a mean residence time of 3.6 hours; the density of the ethylene-1-butene copolymer thus obtained was 0.921 g/cm³: MFR was 1.01 g/10 minutes; the cold xylene-soluble fraction content was 4.3% by weight; and the bulk density was 0.403 g/cm³. The ethylene-1-butene copolymer thus obtained had a high bulk density and a low content of cold xylene-soluble fraction, and the entrainment rate was 0.13% by weight. No aggregate was formed in the gas phase fluidized bed type reactor.

Example 2

A solid catalyst component (A2) having a particle diameter of 28 $\mu$m was prepared by repeating the procedure of Example 1, except that, in the synthesis of solid catalyst component (A1) in Example 1, the temperature at the time of dropping butyl-magnesium chloride was altered to 5° C., the conditions (temperature and time) of stirring after completion of the dropping was altered to 5° C. for 1 hour followed by 20° C. for 1 hour, and the speed of stirring was altered to 220 rpm.

A prepolymerization was carried out by the use of this solid catalyst component (A2) having a particle diameter of 28 $\mu$m in the same manner as in Example 1, except that the quantity of TEA charged, expressed in terms of Al, was altered to 6 mol/mol times of Ti in the solid catalyst component (A2), namely (Al/Ti=6), the inner pressure of reactor after feeding of butane was altered to 0.38 MPaG, and the inner pressure of reactor after feeding butane and then feeding hydrogen to elevate the pressure was altered to 1.38 MPaG. As a result, 17.4 kg of prepolymerization catalyst (2) was obtained. The prepolymerization catalyst (2) thus formed could smoothly be withdrawn from the reactor.

In the prepolymerization catalyst (2) obtained above, the ratio of aluminum to titanium (Al/Ti) was 6, the ratio of the mass of prepolymerization catalyst (2) to the mass of solid catalyst component (A2) (prepolymerization catalyst/solid catalyst component) was 10.5 g/g, the volatile material content of the prepolymerization catalyst (2) was 0.28% by weight, the intrinsic viscosity [η] was 1.36 dl/g, the bulk density was 0.364 g/cm³, and the weight-average particle diameter was 69 $\mu$m.

Using the prepolymerization catalyst (2) obtained above, a gas phase polymerization was carried out in the same manner as in Example 1. As a result, the catalyst activity was 24,200 g/g at a mean residence time of 3.4 hours, density of the ethylene-1-butene copolymer obtained was 0.9204 g/cm³, MFR was 0.94 g/10 minutes, the content of cold xylene-soluble fraction was 4.1% by weight, and the bulk density was 0.362 g/cm³. The entrainment rate was 0.16% by weight.

Example 3

A solid catalyst component (A3) having a particle diameter of 41 $\mu$m was prepared by repeating the procedure of Example 1, except that, in the synthesis of solid catalyst component (A1) in Example 1, the temperature at the time of dropping butyl-magnesium chloride was altered to 5° C., the temperature and time of stirring after completion of the dropping were altered to 5° C. for 1 hour followed by 20° C. for 1 hour, and the speed of stirring was altered to 140 rpm.

A prepolymerization was carried out using this solid catalyst component (A3) having a particle diameter of 41 $\mu$m in the same manner as in Example 1, except that the charged quantity of TEA, expressed in terms of Al quantity, was altered to 6 mol per mol of Ti contained in the solid catalyst component (A3), namely Al/Ti=6, the inner pressure of the reactor after feeding of butane was altered to 0.04 MPaG, and the inner pressure of the reactor after feeding butane and further feeding hydrogen to elevate the inner pressure was altered to 1.04 MPaG. As a result, 29.0 kg of prepolymerization catalyst (3) was obtained. The prepolymerization catalyst (3) thus formed could smoothly be withdrawn from the reactor.

In the prepolymerization catalyst (3) obtained above, the ratio of aluminum to Ti (Al/Ti) was 6, the ratio of the mass of the prepolymerization catalyst (3) to the mass of solid catalyst component (A3) (prepolymerization catalyst/solid catalyst component) was 18.3 g/g, the content of volatile material in the prepolymerization catalyst (3) was 0.34% by weight, the intrinsic viscosity [η] was 1.69 dl/g, the bulk density was 0.361 g/cm$^3$, and the weight-average particle diameter was 111 μm.

Using the prepolymerization catalyst (3) obtained above, a gas phase polymerization was carried out in the same manner as in Example 1. As a result, the catalyst activity was 17,400 g/g at a mean residence time of 3.8 hours, density of the ethylene-1-butene copolymer obtained was 0.9204 g/cm$^3$, MFR was 0.97 g/10 minutes, the content of cold xylene-soluble fraction was 4.6% by weight, and the bulk density was 0.319 g/cm$^3$. The entrainment rate was 0.45% by weight.

Comparative Example 1

A solid catalyst component (A4) having a particle diameter of 45 μm was prepared by repeating the procedure of Example 1, except that, in the synthesis of solid catalyst component (A1) of Example 1, the temperature at the time of dropping butyl-magnesium chloride was altered to 5° C., the temperature and time of stirring after completion of the dropping was altered to 5° C. for 1 hour followed by 20° C. for 1 hour, and the speed of stirring was altered to 120 rpm.

A prepolymerization was carried out by the use of this solid catalyst component (A4) having a particle diameter of 45 μm in the same manner as in Example 1, except that the charged quantity of TEA, expressed in terms of Al quantity, was altered to 2 mol per mol of Ti in the solid catalyst component (A4), namely Al/Ti=2, the inner pressure of the reactor after feeding of butane was altered to 0.15 MPaG, and the inner pressure of the reactor after feeding butane and further feeding hydrogen to elevate the inner pressure was altered to 0.55 MPaG. As a result, the prepolymerization catalyst (4) thus formed could not be withdrawn from the reactor smoothly.

In the prepolymerization catalyst (4) obtained above, the ratio of aluminum to Ti (Al/Ti) was 2, the ratio of the mass of the prepolymerization catalyst (4) to the mass of solid catalyst component (prepolymerization catalyst/solid catalyst component) was 18.7 g/g, the content of volatile material in the prepolymerization catalyst (4) was 0.38% by weight, the intrinsic viscosity [η] was 2.99 dl/g, the bulk density was 0.333 g/cm$^3$, and the weight-average particle diameter was 129 μm.

Comparative Example 2

A solid catalyst component (A5) having a particle diameter of 44 μm was prepared by repeating the procedure of Example 1, except that, in the synthesis of solid catalyst component (A1) in Example 1, the temperature at the time of dropping butyl-magnesium chloride was altered to 5° C., the temperature and time of stirring after completion of the dropping were altered to 5° C. for 1 hour followed by 20° C. for 1 hour, and the speed of stirring was altered to 120 rpm.

A prepolymerization was carried out using this solid catalyst component (A5) having a particle diameter of 44 μm in the same manner as in Example 1, except that the charged quantity of TEA, expressed in terms of Al quantity, was altered to 7.5 mol per mol of Ti in the solid catalyst component (AS), namely Al/Ti=7.5, the inner pressure of the reactor after feeding of butane was altered to 0.26 MPaG, and the inner pressure of the reactor after feeding butane and further feeding hydrogen to elevate the inner pressure was altered to 1.16 MPaG. Further, the period of time for drying in nitrogen atmosphere was altered to 0.5 hour, which was shorter than that in Example 1. As a result, 28 kg of prepolymerization catalyst (5) was obtained.

In the prepolymerization catalyst (5) obtained above, the ratio of aluminum to Ti (Al/Ti) was 7.5, the ratio of the mass of the prepolymerization catalyst (5) to the mass of solid catalyst component (A5) (prepolymerization catalyst/solid catalyst component) was 18.7 g/g, the content of volatile material in the prepolymerization catalyst (5) was 2.5% by weight, the intrinsic viscosity [η] was 1.03 dl/g, the bulk density was 0.378 g/cm$^3$, and the weight-average particle diameter was 143 μm. When a gas phase polymerization was tentatively carried out by the use of this prepolymerization catalyst (5), the prepolymerization catalyst (5) was low in fluidity, so that the prepolymerization catalyst (5) could not be fed smoothly and the gas phase polymerization could not be carried out.

Comparative Example 3

A solid catalyst component (A6) having a particle diameter of 47 μm was prepared by repeating the procedure of Example 1, except that, in the synthesis of solid catalyst component (A1) of Example 1, the temperature at the time of dropping butyl-magnesium chloride was altered to 5° C., the temperature and time of stirring after completion of the dropping was altered to 5° C. for 1 hour followed by 20° C. for 1 hour, and the speed of stirring was altered to 100 rpm.

A prepolymerization was carried out by the use of this solid catalyst component (A6) having a particle diameter of 47 μm in the same manner as in Example 1, except that the charged quantity of TEA, expressed in terms of Al quantity, was altered to 12 mol per mol of Ti in the solid catalyst component (A6), namely Al/Ti=12, the inner pressure of the reactor after feeding of butane was altered to 0.22 MPaG, and the inner pressure of the reactor after feeding butane and further feeding hydrogen to elevate the inner pressure was altered to 1.22 MPaG. As a result, 28.1 kg of prepolymerization catalyst (A6) was obtained.

In the prepolymerization catalyst (6) obtained above, the ratio of aluminum to Ti (Al/Ti) was 12, the ratio of the mass of the prepolymerization catalyst (6) to the mass of solid catalyst component (A6) (prepolymerization catalyst/solid catalyst component) was 17.7 g/g, the content of volatile material in the prepolymerization catalyst (6) was 0.35% by weight, the intrinsic viscosity [η] was 1.40 dl/g, the bulk density was 0.374 g/cm$^3$, and the weight-average particle diameter was 131 μm.

Using the prepolymerization catalyst (6) obtained above, a gas phase polymerization was carried out in the same manner as in Example 1. As a result, the catalyst activity was 21,500 g/g at a mean residence time of 4 hours, density of the ethylene-1-butene copolymer obtained was 0.922 g/cm$^3$, MFR was 1.04 g/10 minutes, the content of cold xylene-soluble fraction was 5.5% by weight, and the bulk density was 0.309 g/cm$^3$. The entrainment rate was 0.37% by weight.

Table 1 illustrates the results given by the prepolymerization catalysts obtained in Examples 1–3 and Comparative Examples 1–3. Table 2 illustrates the catalyst activities in gas phase polymerization using the prepolymerization catalysts obtained, the properties of the ethylene-1-butene copolymers obtained, and the entrainment rates in the operation.

In Examples 1–3 which all satisfy the necessary conditions of the present invention, there is provided a prepolymerization catalyst for use in the gas phase polymerization of olefins showing a high activity in gas phase polymerization, not forming aggregates and coarse particles markedly at the time of prepolymerization, having a high bulk density and an excellent fluidity, not causing a marked entraining of the prepolymerization catalyst and the olefin polymer product out of the fluidized bed at the time of gas phase polymerization, nearly completely free from formation of polymer aggregates, and giving an olefin polymer having a low content of cold xylene-soluble fraction, and a process for producing said prepolymerization catalyst.

In contrast, Comparative Example 1 does not satisfy the condition concerning intrinsic viscosity of prepolymerization catalyst which is one of the necessary conditions of the present invention, and therefore the prepolymerization catalyst cannot be smoothly withdrawn from the prepolymerization reactor. Comparative Example 2 does not satisfy the condition concerning volatile material content which is one of the necessary conditions of the present invention, and therefore the prepolymerization catalyst formed therein is low in fluidity and cannot be fed smoothly. Comparative Example 3 does not satisfy the condition concerning weight-average particle diameter and Al/Ti ratio of the solid catalyst component which are necessary conditions of the present invention, and therefore the ethylene-1-butene copolymer obtained therein is high in the content of cold xylene-soluble fraction.

TABLE 1

|  | Weight-average particle diameter of solid catalyst component (μm) | Al/Ti ratio (mol/mol) | Prepolymerization catalyst/solid catalyst component (g/g) | Content of volatile materials (VM) (% by wt.) | Weight-average particle diameter of prepolymerization catalyst (μm) | Intrinsic viscosity [η] (dl/g) |
|---|---|---|---|---|---|---|
| Example 1 | 21 | 5 | 11.3 | 0.42 | 55 | 1.46 |
| Example 2 | 28 | 6 | 10.5 | 0.28 | 69 | 1.36 |
| Example 3 | 41 | 6 | 18.3 | 0.34 | 111 | 1.69 |
| Comparative Example 1 | 45 | 2 | 18.7 | 0.38 | 129 | 2.99 |
| Comparative Example 2 | 44 | 7.5 | 18.7 | 2.5 | 143 | 1.03 |
| Comparative Example 3 | 47 | 12 | 17.7 | 0.35 | 131 | 1.40 |

TABLE 2

|  | Catalyst activity (g/g) | Density (g/cm$^3$) | MFR (g/10 min.) | CXS (% by wt.) | Bulk density (g/cm$^3$) | Entrainment rate (% by wt.) |
|---|---|---|---|---|---|---|
| Example 1 | 27,000 | 0.921 | 1.01 | 4.3 | 0.403 | 0.13 |
| Example 2 | 24,200 | 0.9204 | 0.94 | 4.1 | 0.362 | 0.16 |
| Example 3 | 17,400 | 0.9204 | 0.97 | 4.6 | 0.319 | 0.45 |
| Comparative Example 1 | Gas phase polymerization could not be carried out, because the prepolymerization catalyst could not be withdrawn smoothly. | | | | | |
| Comparative Example 2 | Gas phase polymerization could not be carried out, because the prepolymerization catalyst could not be fed smoothly. | | | | | |
| Comparative Example 3 | 21,500 | 0.922 | 1.04 | 5.5 | 0.309 | 0.37 |

Effects

According to the present invention, it is possible to produce an olefin polymer showing a high activity at the time of gas phase polymerization, not forming aggregates and coarse particles markedly at the time of prepolymerization, having a high bulk density and an excellent fluidity, not causing a marked entraining of prepolymerization catalyst and product powder out of the fluidized bed at the time of gas phase polymerization, nearly completely free from formation of aggregates, and giving an olefin polymer having a low content of cold xylene-soluble fraction, and it is also possible to produce an olefin polymer having a low content of cold xylene-soluble fraction by the use of said prepolymerization catalyst.

What is claimed is:

1. A prepolymerization catalyst for use in a gas phase polymerization of an olefin or combinations of olefins which comprises (A) a solid catalyst component comprising magnesium, halogen, titanium and an electron donor and having a weight-average particle diameter of 15 to 45 μm, (B) at least one organoaluminum compound and (C) a prepolymer of an ethylene and/or at least one α-olefin, wherein the molar ratio of aluminum to titanium (Al/Ti ratio) in the prepolymerization catalyst is 3 to 11 (mol/mol), the weight ratio of the prepolymerization catalyst to the solid catalyst component (prepolymerization catalyst/solid catalyst component) is 4 to 25 (g/g), the content of volatile materials (VM) in the prepolymerization catalyst is 2.0% by weight or less, and the intrinsic viscosity [η] measured in tetralin at 135° C. is 2.0 dl/g or less.

2. The prepolymerization catalyst for use in a gas phase polymerization according to claim 1, wherein the weight-average particle diameter of the prepolymerization catalyst is 15 to 75 μm.

3. The prepolymerization catalyst for use in a gas phase polymerization according to claim 1, wherein the weight-average particle diameter of the catalyst component (A) is 20 to 35 μm.

4. The prepolymerization catalyst for use in a gas phase polymerization according to claim 1, wherein the content of volatile materials (VM) is 0.5% by weight or less.

5. The prepolymerization catalyst for use in a gas phase polymerization according to claim 1, wherein the intrinsic viscosity [η] measure in tetralin at 135° C. is 1.7 dl/g or less.

6. The prepolymerization catalyst for use in a gas phase polymerization according to claim 1, wherein the ratio of aluminum to titanium (Al/Ti ratio) is 4 to 8 (mol/mol).

7. The prepolymerization catalyst for use in a gas phase polymerization according to claim 1, wherein said solid catalyst component (A) is obtained by bringing a solid catalyst component precursor comprising magnesium, titanium and a hydrocarbyloxy group into contact with a halogen compound of an element belonging to Group 14 of the periodic table and an electron donor to form a contacted product, followed by further bringing the contacted product into contact with a compound having a Ti-halogen bond.

8. The prepolymerization catalyst for use in a gas phase polymerization according to claim 7, wherein said solid catalyst component precursor is a solid product containing a trivalent titanium atom obtained by reducing a titanium compound represented by the following general formula:

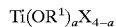

$$Ti(OR^1)_a X_{4-a}$$

wherein $R_1$ represents a hydrocarbon group having 1 to 20 carbon atoms, X represents a halogen atom and a represents a number satisfying $0 < a \leq 4$, with an organo-magnesium compound in the presence of an organosilicon compound having a Si—O bond, said halogen compound of an element belonging to Group 14 of the periodic table is a compound represented by the following general formula:

$$SiR^2_{4-b} X_b$$

wherein $R^2$ represents a hydrocarbon group having 1 to 20 carbon atoms, X represents a halogen atom and b represents a number satisfying $0 < b \leq 4$, and said electron donor is an ester of an organic acid or an ether.

9. A process for producing the prepolymerization catalyst for use in a gas phase polymerization according to any one of claims 1–8, which comprises polymerizing an ethylene and/or at least one α-olefin by the use of (A) a solid catalyst component comprising magnesium, halogen, titanium and an electron donor and having a weight-average particle diameter of 15 to 45 μm and (B) at least one organoaluminum compound.

* * * * *